April 19, 1966   D. B. PALL   3,246,766
FILTER ELEMENT
Filed Feb. 15, 1963   2 Sheets-Sheet 1

April 19, 1966  D. B. PALL  3,246,766
FILTER ELEMENT
Filed Feb. 15, 1963  2 Sheets-Sheet 2

United States Patent Office 3,246,766
Patented Apr. 19, 1966

3,246,766
FILTER ELEMENT
David B. Pall, Roslyn Estates, N.Y., assignor to Pall Corporation, Glen Cove, N.Y., a corporation of New York
Filed Feb. 15, 1963, Ser. No. 258,729
7 Claims. (Cl. 210—457)

This invention relates to core supports for filter elements and particularly for cylindrical filter elements which require a supporting core which is uniformly cylindrical in cross section.

Tubular filter elements prepared of non-rigid sheet or mat filter materials which are susceptible to distortion or rupture under high fluid pressures, such as paper, resin-reinforced glass fibre mats, textile fabrics, felt and the like, are usually fabricated with a supporting core of more substantial material, such as metal or rigid synthetic resin or cellulose derivative. The core prevents distortion or collapse of the filter element at high pressure differentials across the filter. Supports are particularly desirable when the filter element is in a corrugated or undulating configuration. Cores also may assist in preventing migration of portions of the filter sheet or mat which may become detached in use.

In most filter elements, the direction of flow is from the outside of the element to the inside, so as to provide the greater outside surface area and space surrounding the filter for collection of debris and other material removed from the fluid, and thus in such cases the core is placed on the inside of the filter tube. Occasionally, cores are placed on the outside, and on both sides, of the filter tube.

It is, of course, essential that the core contain openings to permit passage of fluid to or from the filter element. The necessity for providing openings in the core complicates the fabrication, and for simplicity it is customary to employ a sheet metal or other material, which is provided with openings of perforations, and then sheared to size, and rolled to form the cylinder core with a lapped or butted edge seam. In order to prevent the adjoining edges of the rolled sheet from sliding over each other, and hold the cylinder to a uniform diameter, the seam must be bonded. This can be done by welding, but a welded seam is expensive to form, and the fusion weld tends to warp the structure adjacent to the weld, while a lap spot weld will leave a step in the core at the seam, and is not as strong. Fusion welds also result in local softening of some materials, such as work-hardened stainless steel.

It is of course possible to omit the welding, and allow the seam to remain with lapped or butted edges. This is less expensive, and avoids the warping introduced by the weld, but results in a lower strength and nonuniform diameter, since the laps can slide over each other. Furthermore, it is difficult to form and close such a core unless annealed material is employed, and such materials have relatively low strength.

Whenever a sheet material is employed to form a cylinder, it is quite difficult to obtain a cylinder which is uniformly round. Nonetheless, a true circularity of section is an indispensable requirement for optimum differential pressure rating. The shaping of the sheet to form the cylinder requires a considerable amount of hand labor for rolling, closing the seam and testing the resulting structure for circularity.

In accordance with the invention, core supports for filter elements are provided which are closed in cross section and which are uniform in any desired configuration, for example, which are elliptical, or polygonal, or which are truly circular in cross section when in cylindrical configuration, and which can be formed at low cost, with a minimum of hand labor. By a "closed" configuration, it is meant that the side walls are joined and endless, and the total circumference is taken as 360°, for convenience, even when the configuration is noncircular.

The core supports of the invention are made in at least two matching sections, which when assembled in abutting relationship compose a complete core support, i.e., the complete 360° closed cross section of the support. Each of the matching sections extends over no more than a 180° arc of the complete support, and may extend over an arc as small as 45°, depending on the cross-sectional configuration. Therefore, each section when made of sheet metal can readily be prepared in a single stroke of a press on a progressive die.

By this technique, the cross-sectional configuration and dimensions of the sections can be held very closely, and the greater part of the fabrication of the completed core, including assembly of the sections, can be done by machine. Openings can be made in the sheet at the same time as the sheet is pressed out in the desired configuration of a particular section, and thus fabrication of the openings as a separate operation is eliminated. The sections employed to compose the core can be used in their work-hardened, as drawn, state, and thus the wall sections employed can be very thin.

Sections composing the internal core supports of the invention can be simply butted together in use, since they are held in position by the filter element which encloses them. However, if greater strength or resistance to torque is required, they can be bonded together. Metal sections can be spot-welded along their abutting edges, or brazed or soldered, to prevent their separation.

Any number of sections can be employed to form a core support, and the sections can be of any desired configuration which collectively forms the desired closed cross-sectional configuration of the core support. Ordinarily, it is sufficient and preferable to employ only two core sections to form a single core support, so that each core section forms 180° of the arc of the core.

Since the sections are machine-made uniformly they will match perfectly, and there will be no problem in abutting the ends of the sections, even though thin sheet be used. However, it is generally preferred to form the sections with a flange over all or a part of their peripheries, extending inwardly, preferably, in the case of internal core supports, and outwardly, in the case of external core supports. A flange is particularly desirable when the sections are simply to be butted together rather than welded, soldered or brazed, since the flange will prevent disengagement and slipping of the butted ends, so that one section cannot slide across the surface of the other. The flange will also facilitate bonding, i.e., brazing, welding or soldering, of the seam between adjacent sections, by providing a greater contact area at the seam.

The core section can be provided with flanges on its abutting peripheries having raised portions or depressed portions matching corresponding depressed portions or raised portions, respectively, on the abutting flange of the adjacent core section, to lock the two in position. The raised portions can take the form of pins, knobs, studs, bosses, and the like, and the depressed portions can be dimples, indentations, hollows, sockets, holes, slots, and the like, to match the raised portions. Normally, a flange with raised portions and one with depressed portions would be provided on each core section, so that they can be placed in order, raised flange abutting depressed flange, in forming the core support.

The surfaces of the core sections can be absolutely smooth and flat. To provide greater rigidity to the core support, the sections also can be formed with transverse raised portions, such as ribs, and corresponding depressed or indented portions, such as grooves. A section of this configuration can be provided with a flange which does not extend beyond the surface of the core, by restricting the flange to the depressed portions between the ridges or ribs, to meet such raised portions at the periphery of the core sections.

Openings can be provided in any desired number and pattern, depending upon the fluid flow required. The core support can be formed in any size, according to the filter which is to be supported. The interior of the core normally will serve as the passage for filtrate flow. It is usually desirable so to fashion the ends of the core sections that the completed core support and end portions fitted thereto will match the flow passages externally of the filter element.

The core support sections of the invention can be formed of any desired material sufficiently rigid to provide adequate support for the filter with which it is to be used. Metal core supports are preferred, such as core supports of stainless steel or aluminum, which are readily stamped in any desired cross-sectional configuration, and which will retain that configuration and provide the desired rigidity. Stainless steel, which provides greater resistance to certain highly reactive fluids, is preferred. Steel, copper, magnesium, beryllium, titanium, nickel, iron and various alloys thereof are typical additional metals which can be used.

The core supports of the invention also can be formed of rigid synthetic polymeric materials and cellulose derivatives, such as, for example, glass, ceramics, phenol-formaldehye resins, polytetrafluoroethylene, polychlorotrifluoroethylene, urea-formaldehyde resins, melamine-formaldehyde resins, polyvinyl chloride, polyvinylidene chloride, polystyrene, epoxy resins, polyoxymethylene, polypropylene, polyethylene, polyvinyl butyral, cellulose acetate, ethyl cellulose and cellulose acetate propionate. Cores made of such materials can be formed into core sections by molding from powders of the material, or by stamping or shaping of sheets of the material. This may be easier than molding the entire core support, in the case of complex cross sectional configurations and when complex end connections for the core support are necessary. The plurality of sections composing such core supports of the invention can be bonded together by application of heat and pressure, or a suitable adhesive, or by application of a solvent for the material which will make possible fusion of the adjacent edges of the sections at the seams.

Figure 1:
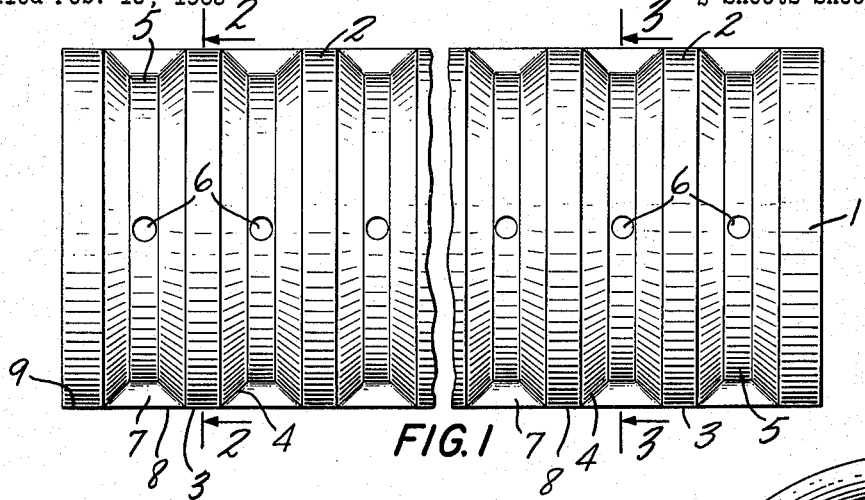
FIGURE 1 is a longitudinal top view of a 180° circular core section having rib groove portions for a cylindrical core support in accordance with the invention.
Figure 2:
FIGURE 2 is a cross section of the core section of FIGURE 1, taken through a rib portion along the line 2—2.
Figure 3:
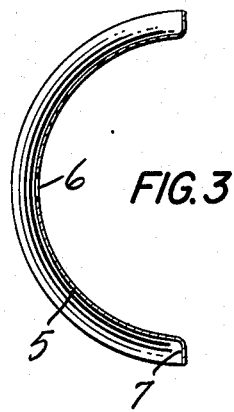
FIGURE 3 is a cross section of the core section of FIGURE 1 taken through a groove portion along the line 3—3.

The core section of FIGURES 1 to 3, inclusive, comprises a sheet 1 of stainless steel formed in a 180° arc comprising half of a cylinder. The hemicylindrical core section is provided with a plurality of raised portions 2 constituting ribs having a flat top 3 and side walls 4 inclined at an angle thereto, which as shown is approximately 45°, but which can be any angle up to 90°. The ribs 2 define between them a corresponding plurality of depressed portions 5 constituting grooves.

Each such portion has at its center, intermediate the ends of the section, an opening 6, and terminates in a flange 7, which extends between the opposed side walls 4 of adjacent ribs, and thus provides the peripheries of the hemicylindrical section with a continuous edge 8 at the same relative position as the rib tops 3. Thus, when two hemicylindrical core sections are placed with the ends in abutting relationship, the seam presents a uniformly flat edge at the top surface of the core support, not extending beyond the rib tops. This edge can readily be spot welded, brazed or soldered, as desired, or simply allowed to remain in abutting relationship, held in place by the filter itself. The flange 7 formed by the end sections of the depressed portions provides additional support at the butted ends, and prevents slippage of one core section over the other at the seam should the core sections be displaced laterally slightly by a distance less than the width of the flange.

The core section terminates at each end with an open rib portion 9 constituting a flange, and adapted to match with the end caps or other end support for the filter element in which it is used.

Figure 5:
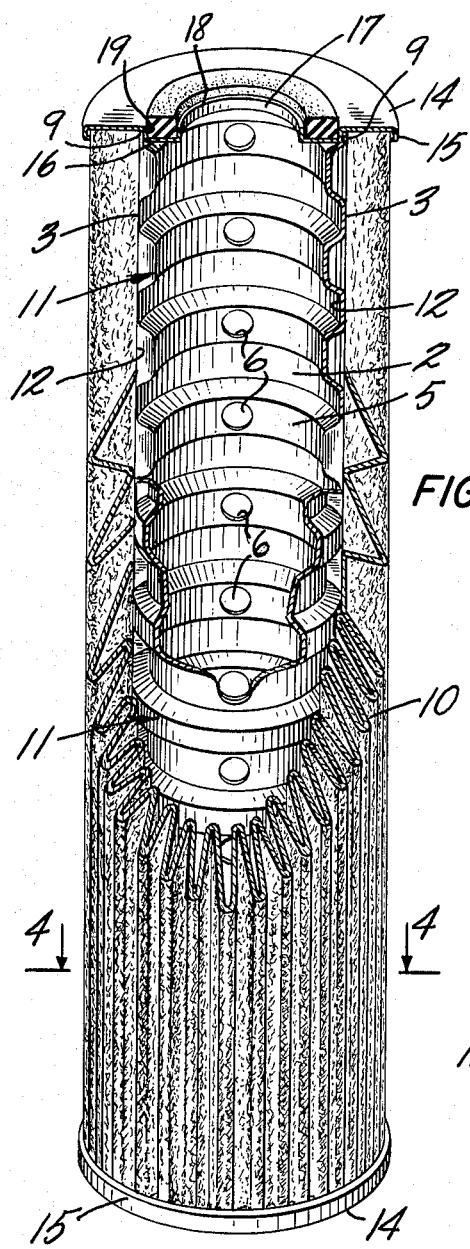
FIGURE 5 is a perspective view, with parts cut away, of the filter element of FIGURE 4.
Figure 4:
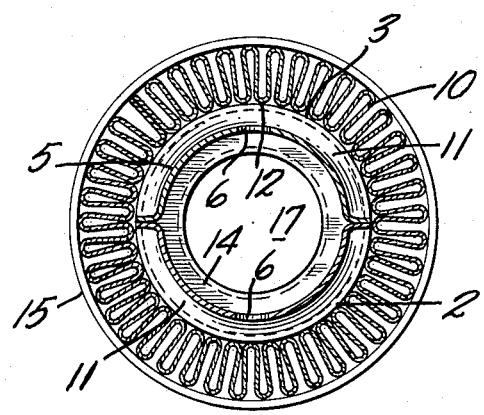
FIGURE 4 is a cross sectional view of a cylindrical filter element in corrugated form supported by an internal core formed of two juxtaposed cross sections in accordance with FIGURE 1.

In use, two hemicylindrical core sections of the type shown in FIGURES 1 to 3, inclusive, would be placed in abutting relationship to constitute the internal support core for a filter element, as shown in FIGURES 4 and 5. The corrugated filter 10 encloses the core sections 11 tightly in such a manner that the inner tips 12 of the corrugations are in contact with the rib tops 3 on the outer surface of the core support. The filter is formed of a corrugated paper sheet, the ends of which are brought together, lapped and sealed or bonded at the lapped seam, thus forming a corrugated cylinder. Typically, the filter of FIGURES 4 and 5 is made of paper preferably impregnated with a synthetic resin, such as an epoxy resin, or an epoxy resin-silicone resin mixture. It will be apparent that the internal core support sections 11 can be displaced laterally only slightly, because of the enclosing filter 10, and at the same time they together support each other and the filter, preventing distortion or collapse of the filter element under high external fluid pressures or pressure differentials.

It will be apparent from FIGURES 4 and 5 that the depressed portions or grooves 5 between the raised portions or ribs 2 of the core sections 11 serve as channels for the passage of filtrate from the filter 10 to the openings 6 of the core, facilitating passage of fluid from the filter 10 to the central passage 12 for filtrate flow, enclosed by the core sections 11.

The entire filter element is held together by the end caps 14, each of which is provided with an outer flange 15 retaining the corrugated filter, and a central internally raised portion 16 including a flanged aperture 17, and fitting tightly within the flanged end 9 of the core sections 11 as an internal support therefor. Intermediate the flange 15 and the raised portion 16 are two externally raised portions 18 and 19 which are adapted to form a tight seal with a gasket in the filter assembly in which the filter element is used. The raised portion 16 holds the core support firmly in position, and in cooperation with the end flanges 9 thereof, and the filter 10 and flange 15 prevents both lateral and lengthwise displacement of the core sections 11 and filter 10.

The end caps 14 are held in position by bonding to the filter 10 and core sections 11. The flanged aperture 17 is adapted to fit with existing filtrate flow lines of the filter assembly, or with another filter element, via a sealing gasket (not shown).

In operation, fluid to be filtered passes through the filter element from the outside towards the inside, first entering the filter 10, then flowing along a groove 5 formed by the depressed portion of the core sections 11, to and through the opening 6 and into the central passage 12 enclosed by the core sections, whence it can be drawn off through the central opening 17 in either or both of the ends caps 14.

Figure 7:
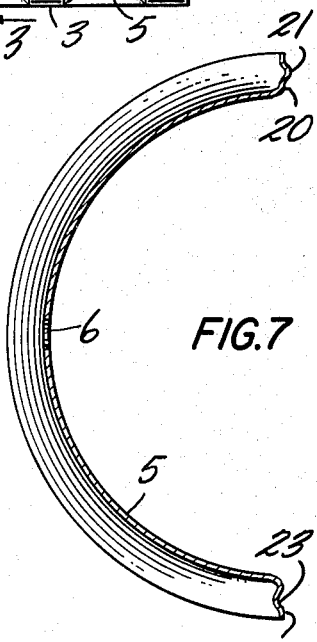
FIGURE 7 is a cross section of the core section of FIGURE 6, taken along the line 7—7 of FIGURE 6.
Figure 6:
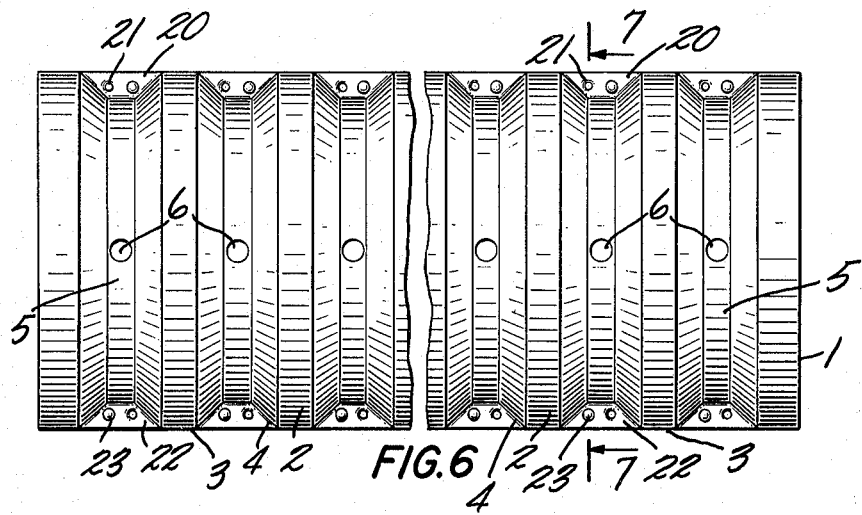
FIGURE 6 is a longitudinal top view of a core section similar to that of FIGURE 1, but with bosses on one flange and matching hollows on another.

The core sections of FIGURES 6 and 7 is similar to that of FIGURES 1 to 3, with the additional feature of bosses and hollows in the flanges to lock adjacent core sections in position, making it unnecessary to bond the core sections together. The right-hand flange 20 has a plurality of bosses 21, best seen in FIGURE 7, and the left-hand flange 22 has a plurality of hollows 23. Two such core sections placed with the embossed flange adjacent the flange with the hollows, will lock together with the bosses projecting into the hollows, and thus nested together are not displaced laterally. Thus, bonding as by welding or brazing is unnecessary, and individual sections of such a core support are easily replaced, if damaged in use.

The core supports of the invention are readily prepared from any sheet material by simple stamping or drawing, and need not be annealed. Such stamping and drawing operations are well known to those skilled in this art, and need not be described in greater detail. The core sections are formed to the desired arc portion of a circle or other closed configuration, such as a polygonal, e.g., rectangular, octagonal, or square, configuration, or an elliptical configuration. The core sections thus formed are put together in sufficient number to form the complete core.

If the core is to serve as an internal support for the filter element, it is then slipped into the central portion enclosed by the filter. Contrariwise, if it is to form the external support for the element, it is slipped over the outside of the filter.

If the sections of the core support are to be bonded together, as by welding, brazing or soldering, this is done before the element is slipped into or over the outside of the filter element itself.

The open ends of the composite thus formed then desirably are closed off by end caps, which receive the ends of the core support and of the filter in such a manner as to hold them firmly in position. The filter element is then complete, and ready for use in any type of filter unit.

Because the core support can be accurately made in any desired configuration, it will impart an equally accurate configuration to any filter supported thereby. A truly circular cylindrical filter can be ensured by use of the core supports of the invention, for example, and more exotic shapes can be formed with equal ease. In this way, uniformly excellent flow characteristics over all of the surface area of the filter can be obtained.

The following is claimed:

1. A filter element comprising (1) a nonrigid filter material formed in a closed configuration; (2) a core support for the filter material; and (3) end portions retaining the filter material and core support in juxtaposed relationship, the core support comprising a plurality of unitary core support sections of substantially rigid sheet material held together to form the core, each of said sections individually defining an arc portion within the range from about 45° to about 180° of the circumference of the core support, together defining 360° of the circumference of the core support and enclosing a central open passage; the core support sections each having a plurality of raised and depressed portions, and openings disposed in the depressed portions for passage of fluid therethrough from the outside to the inside of the core support; the raised portions being in contact with a portion of the filter material, the depressed portions having edges matching and joining to the corresponding edges of the raised portions, and both the raised and depressed edges of each core section matching and abutting the corresponding raised and depressed edges of the next succeeding core section, the edges of the depressed portions being provided with flanges extending outwarrdly therefrom to a distance at most substantially equal to the height of the raised portions, the flanges of each core section abutting the flanges of the next succeeding section.

2. A filter element in accordance with claim 1 comprising a pair of core sections, each composing a 180° arc portion of the circumference of the core support.

3. A filter element in accordance with claim 1 in which the core sections compose arcs of a circle and together form a cylindrical core support.

4. A filter element in accordance with claim 1 wherein the core sections are bonded together along at least a portion of the abutting flanges thereof.

5. A filter element in accordance with claim 1 wherein the end portions are caps having an outer flange enclosing the filter material and provided with an internally raised central portion for engagement with the interior of the ends of the core sections.

6. A filter element in accordance with claim 1 wherein the filter material is in corrugated form.

7. A filter element in accordance with claim 1 wherein the core sections are disposed internally of the filter element.

References Cited by the Examiner

UNITED STATES PATENTS

| | | | |
|---|---|---|---|
| 1,585,266 | 5/1926 | Schlafly | 138—159 X |
| 1,647,907 | 11/1927 | Doty | 210—497 X |
| 2,126,938 | 8/1938 | Williams et al. | 210—437 X |
| 2,562,328 | 7/1951 | Null | 210—489 X |
| 2,739,916 | 3/1956 | Parker | 210—493 X |
| 2,910,183 | 10/1959 | Hayes | 210—483 X |

REUBEN FRIEDMAN, *Primary Examiner.*

HERBERT L. MARTIN, *Examiner.*